United States Patent
Sherwood

(10) Patent No.: US 12,431,132 B2
(45) Date of Patent: Sep. 30, 2025

(54) NATURAL SPEECH DETECTION

(71) Applicant: Cirrus Logic International Semiconductor Ltd., Edinburgh (GB)

(72) Inventor: William E. Sherwood, Salt Lake City, UT (US)

(73) Assignee: Cirrus Logic Inc., Austin, TX (US)

( * ) Notice: Subject to any disclaimer, the term of this patent is extended or adjusted under 35 U.S.C. 154(b) by 367 days.

(21) Appl. No.: 17/989,266

(22) Filed: Nov. 17, 2022

(65) Prior Publication Data

US 2024/0169982 A1    May 23, 2024

(51) Int. Cl.

| | |
|---|---|
| *G10L 15/22* | (2006.01) |
| *G10L 15/28* | (2013.01) |
| *G10L 25/18* | (2013.01) |
| *G10L 25/21* | (2013.01) |
| *H04R 1/40* | (2006.01) |
| *H04R 3/00* | (2006.01) |

(52) U.S. Cl.
CPC .............. *G10L 15/22* (2013.01); *G10L 15/28* (2013.01); *G10L 25/18* (2013.01); *G10L 25/21* (2013.01); *H04R 1/406* (2013.01); *H04R 3/005* (2013.01); *G10L 2015/223* (2013.01)

(58) Field of Classification Search
CPC ......... G10L 15/22; G10L 15/28; G10L 25/18; G10L 25/21; G10L 2015/223; G10L 25/30; H04R 1/406; H04R 3/005; G01S 3/80
USPC ........................................................ 704/251
See application file for complete search history.

(56) References Cited

U.S. PATENT DOCUMENTS

2022/0236360 A1* 7/2022 Cordourier Maruri ..................... G01S 3/8083

\* cited by examiner

*Primary Examiner* — Thierry L Pham
(74) *Attorney, Agent, or Firm* — Jackson Walker L.L.P.

(57) ABSTRACT

A system, comprising: a plurality of distributed smart devices comprising: a first smart device having a first microphone; a second smart device having a second microphone; and processing circuitry, configured to: receive, from the first microphone, a first microphone signal comprising speech of a user; receive, from the second microphone, a second microphone signal comprising the speech of the user; determine an orientation of the user's head relative to the first smart device and the second smart device based on the first microphone signal and the second microphone signal, wherein determining the orientation of the user's head comprises comparing first power levels in a plurality of frequency bands of the first microphone signal; and controlling one or more of the plurality of distributed smart devices based on the determined orientation.

20 Claims, 5 Drawing Sheets

NATURAL SPEECH DETECTION

TECHNICAL FIELD

The present disclosure relates to systems and methods for determining an orientation of a user in a smart environment.

BACKGROUND

Voice biometrics are now increasingly being used in voice user interfaces (VUIs), that is, user interfaces where a user's voice is considered an input, for example in a virtual assistant in a smart device. A user may train a system comprising one or more smart devices by providing samples of their speech during an enrolment phase. In subsequent use, the system is able to discriminate between the enrolled user and non-registered speakers.

Voice biometrics systems can also be used to control access to a wide range of services and systems. In the case of a VUI in a virtual assistant, the user may enter into a dialogue with the virtual assistant via a smart device comprising one or more microphones. Such dialogue may include commands provided by the user. In an environment comprising multiple smart devices, it can be difficult to determine a focus of attention of the user within the environment, as well as which (if any) of the multiple smart devices the user is talking to or whether a command is directed at a specific smart device.

SUMMARY

According to a first aspect of the disclosure, there is provided a system, comprising: a plurality of distributed smart devices comprising: a first smart device having a first microphone; a second smart device having a second microphone; and processing circuitry, configured to: receive, from the first microphone, a first microphone signal comprising speech of a user; receive, from the second microphone, a second microphone signal comprising the speech of the user; determine an orientation of the user's head relative to the first smart device and the second smart device based on the first microphone signal and the second microphone signal, wherein determining the orientation of the user's head comprises comparing first power levels in a plurality of frequency bands of the first microphone signal; and controlling one or more of the plurality of distributed smart devices based on the determined orientation.

Determining the orientation of the user's head may comprise: computing a first power spectrum of the first microphone signal over the plurality of frequency bands of the first microphone signal; and determining one or more characteristics of the first power spectrum. The one or more characteristics of the first power spectrum may be compared with one or more stored characteristics. Additionally or alternatively, the first power spectrum and/or the one or more characteristics may be provided to one or more neural networks.

The one or more characteristics may comprises one or more of: a) spectral slope; b) spectral tilt; c) spectral curvature; and d) a spectral power ratio between two or more of the plurality of frequency bands.

The processing circuitry may be configured to: compare second power levels in a plurality of frequency bands of the second microphone signal; and determine the orientation of the user's head relative to the second smart device based on the comparison of second power levels. The processing circuitry may be configured to: communicate the determined orientation of the head between the first smart device and the second smart device. The processing circuitry may be at least partially comprised in the first smart device and/or the second smart device.

The first and second smart devices may be configured to communicate via a network interface.

The first and second smart devices may be peripheral devices. The plurality of distributed smart devices may comprise a hub device. The first and second smart devices may be configured to transmit respective first and second microphone signals to the hub device. The processing circuitry may be at least partially comprised in the hub device.

The plurality of distributed smart devices may comprise a third smart device. The processing circuitry may be configured to: receive a location of the third smart device relative to the first smart device and the second smart device; and determine a user location of the user based on the location of the third smart device and a location of the first smart device and the second smart device.

The processing circuitry may be further configured to determine a first probability that the first smart device is a focus of the user's attention based on the determined orientation of the head of the user.

The processing circuitry may be further configured to determine a second probability that the second smart device is a focus of the user's attention based on the determined orientation of the head of the user. The processing circuitry may be configured to identify one of the first smart device and the second smart device as a focus of the user's attention based on the first probability and the second probability.

The processing circuitry may be configured to associate a user command comprised in the speech to the identified one of the first smart device and the second smart device.

The first probability and/or the second probability may be estimated based one or more of: a) a usage history of the first smart device and/or the second device; b) an internal state of the first smart device and/or the second device; c) a loudness of speech in the first microphone signal; d) a history of estimated orientations of the head of the user; and e) content of a user command contained in the speech.

The processing circuitry may be further configured to estimate a direction of focus of the user's attention based on the determined orientation.

The first smart device may comprise one of a mobile computing device, a laptop computer, a tablet computer, a games console, a remote control device, a home automation controller or a domestic appliance, a toy, a robot, an audio player, a video player, or a mobile telephone, and a smartphone.

According to another aspect of the disclosure, there is provided a method in a network of distributed smart device, the method comprising: receiving, at a first microphone of a first smart device, a first microphone signal comprising speech of a user; receiving, at a second microphone of a second smart device, a second microphone signal comprising the speech; determining an orientation of a head of the user relative to the first smart device and the second smart device based on the first microphone signal and the second microphone signal, wherein determining the orientation of the user's head comprises comparing first power levels in a plurality of frequency bands of the first microphone signal; and controlling one or more of the network of distributed smart devices based on the determined orientation.

According to another aspect of the disclosure, there is provided a non-transitory storage medium having instructions thereon which, when executed by a processor, cause the processor to perform a method as described above.

According to another aspect of the disclosure, there is provided a system for determining an orientation of a user's head, the system comprising: a first smart device having a first microphone; processing circuitry configured to: receive a first microphone signal comprising speech from the first microphone; compare first power levels in a plurality of frequency bands of the first microphone signal; determine an orientation of the user's head relative to the first smart device based on the comparison of first power levels.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the present disclosure will now be described by way of non-limiting examples with reference to the drawings, in which.

DESCRIPTION OF EMBODIMENTS

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Figure 1:
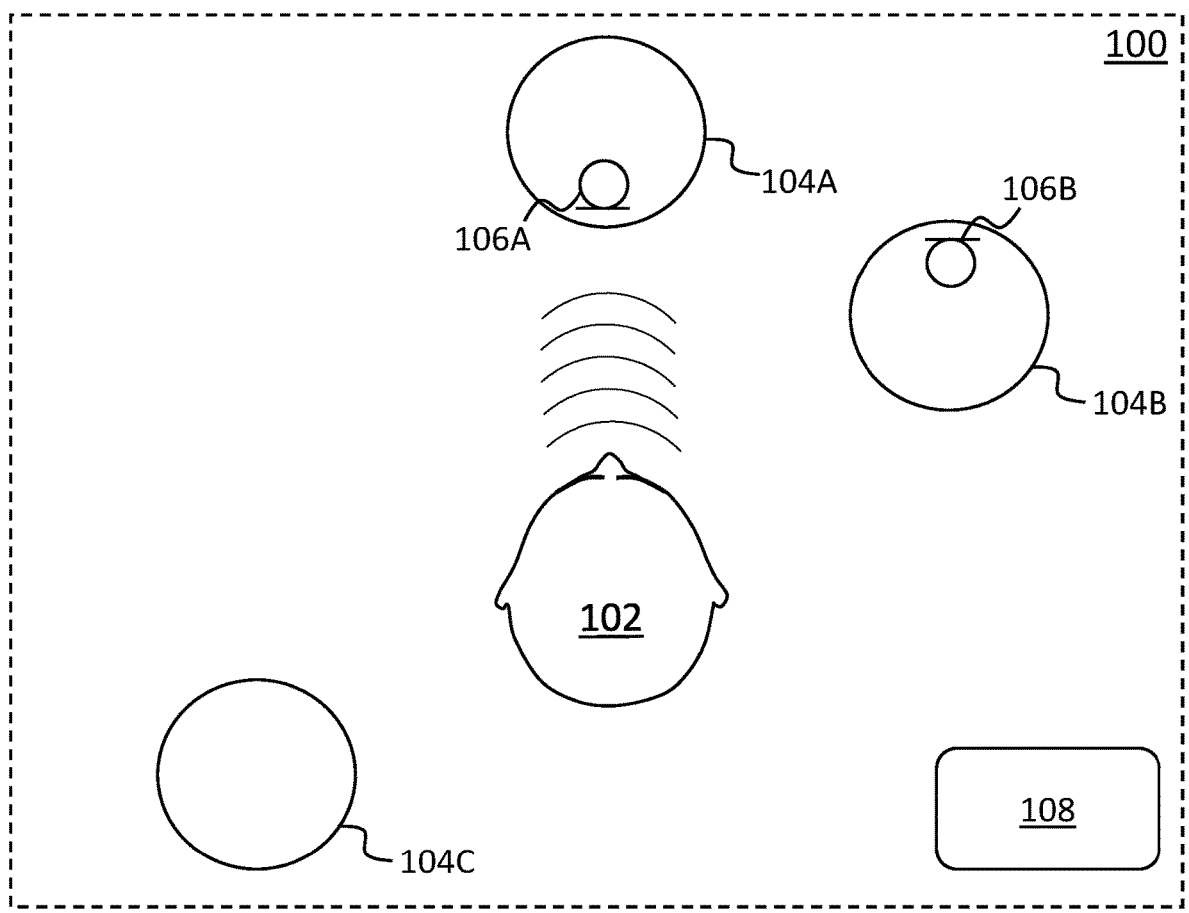
FIG. 1 is a schematic illustration of a system of smart devices in a smart environment.

FIG. 1 is a schematic illustration of a typical smart environment 100 comprising a user 102 and a system of first, second and third smart devices 104A, 104B, 104C. Whilst in this example, three smart devices 104A, 104B, 104C are shown, it will be appreciated that any number of smart devices may be provided in the environment 100. The first and second smart devices 104A, 104B each comprise a respective transducer 106A, 106B (e.g. microphone) capable of converting sound, including speech of the user 102 into electrical audio signals. In this example, the third smart device 104C does not comprise a microphone.

The first, second and third smart devices 104A, 104B, 104C may communicate with one another via one or more network connections. Such communication may be direct or indirect (e.g. via the cloud or the like). Optionally, a smart hub 108 may be provided. In which case, the first, second and third smart devices 104A, 104B, 104C may communicate via the smart hub 108. The first, second and third smart device 104A, 104B, 104C and the smart hub 108 may each communicate with one another via a wired or wireless network.

Each of the first, second, third smart devices 104A, 104B, 104C may implement a virtual assistant. Each of the first, second, third smart devices 104A, 104B, 104C may be a dedicated smart device (e.g., a dedicated voice assistant device) or may be a device into which smart functionality is integrated, such as a television, a radio, or any other smart device. Each of the first, second and third smart devise 104A, 104B, 104C may comprise or be embodied in, for example, a remote control system, a home control system, a home entertainment system, a smartphone, a tablet or laptop computer, a games console, an in-vehicle entertainment system, a domestic appliance or the like.

The first and second smart devices 104A, 104B may be operable to distinguish between spoken commands from an enrolled user, and the same commands when spoken by a different person, in microphone signals received at their respective microphones 106A, 106B. Each of the first and second devices 104A, 104B may be configured to perform speaker recognition processes and/or speech recognition processes on the received sound (although such processes may be performed elsewhere such as in the cloud). Such processes may be performed to interpret one or more keywords or commands spoken by an enrolled user, such as the user 102. For example, the first and second smart devices 104A, 104B may be configured to continuously listen for trigger words (e.g. "Hey Siri") and/or commands (e.g. "Open Spotify") present in sound received at the audio device. Thus, certain embodiments of the disclosure relate to the operation of the first and second smart devices 104A, 104B or any other device in which biometric functionality is performed in the device that is intended to carry out the spoken command. Certain other embodiments may relate to methods in which the voice biometric functionality is performed on the first and second smart devices 104A, 104B, which then transmits the commands to a separate (host) device (such as the smart hub 108) if the voice biometric functionality is able to confirm that the speaker was the enrolled user.

Figure 2:
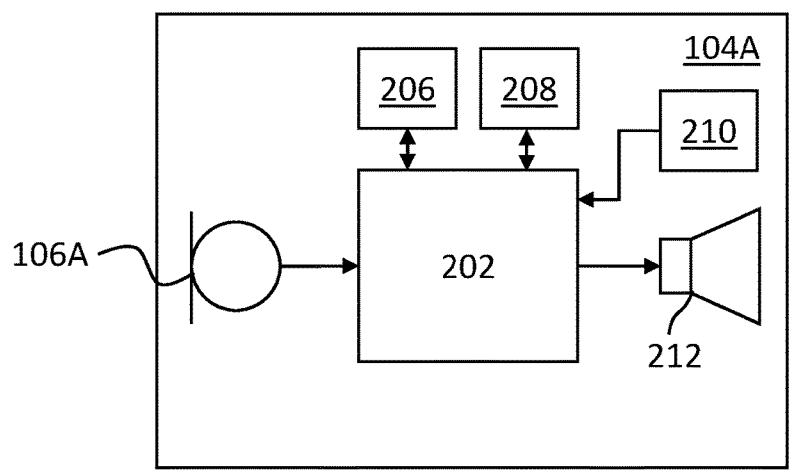
FIG. 2 is a block diagram of an example smart device of the system of FIG. 1.

FIG. 2 is a schematic diagram of an example implementation of the first smart device 104A. The second and third smart devices 104B, 104C may be implemented similarly. The smart hub 108 may also be implemented similarly.

The first smart device 104A comprises a signal processor 202 configured to receive microphone signal from the first microphone 106A. The processor 202 may be configured to perform speech recognition and/or speaker recognition on the received microphone signal. For example, the processor 202 may be configured to obtain biometric data from the first microphone 106A.

The first smart device 104A further comprises a memory 206, which may be provided as a single component or as multiple components. The memory 206 is provided for storing data and/or program instructions. The first smart device 104A may further comprise a transceiver 208, which is provided for allowing the audio device 100 to communicate (wired or wirelessly) with external device(s), such as the second and third smart devices 104B, 104C and/or a host device (such as the smart hub 108). For example, the first smart device 104A may be connected to a network and configured to transmit audio and/or voice biometric data received at or generated by first smart device 104A to the cloud or to a remote server for further processing. Communications between the first smart device 104A and external device(s) may comprise wired communications where suitable wires are provided. The first smart device 104A may be powered by a battery 210 and may comprise other sensors (not shown). The first smart device 104A may additionally comprise a loudspeaker 212.

It will be appreciated that methods described herein may be implemented on the first smart device 104A or on a host device (such as the smart hub 108) to which the first smart device 104A is connected, or in the cloud (e.g. on a remote server), or a combination of all three.

The scenario shown in FIG. 1 can poses a challenge for the first, second and third smart devices 104A, 104B, 104C due to the presence of the multiple smart devices 104A, 104B, 104C which may each be configured to listen for commands associated with operation of the devices 104A, 104B, 104C or other devices within or outside of the smart environment 100. For example, when the user 102 speaks, they generate speech which may be picked up by both the first and second transducers 106A, 106B. Thus, it may be difficult to determine the focus of the user's attention (i.e. to which device a particular command was directed).

It would therefore be advantageous to be able to determine a focus of a user's attention, for example by determining an orientation of a user relative to the various smart devices 104A, 104B, 104C using the devices 104A, 104B, 104C themselves. From such a determination, one or more conclusions may be derived as to the intention of a voice command or statement provided by the user 102 within the smart environment 100 and one or more functions actioned based on the derived conclusions.

Embodiments of the present disclosure aim to address or at least ameliorate one or more of the above described issues by taking advantage of the frequency dependent nature of human speech propagation relative to the direction that the user 102 is facing.

Figure 3:
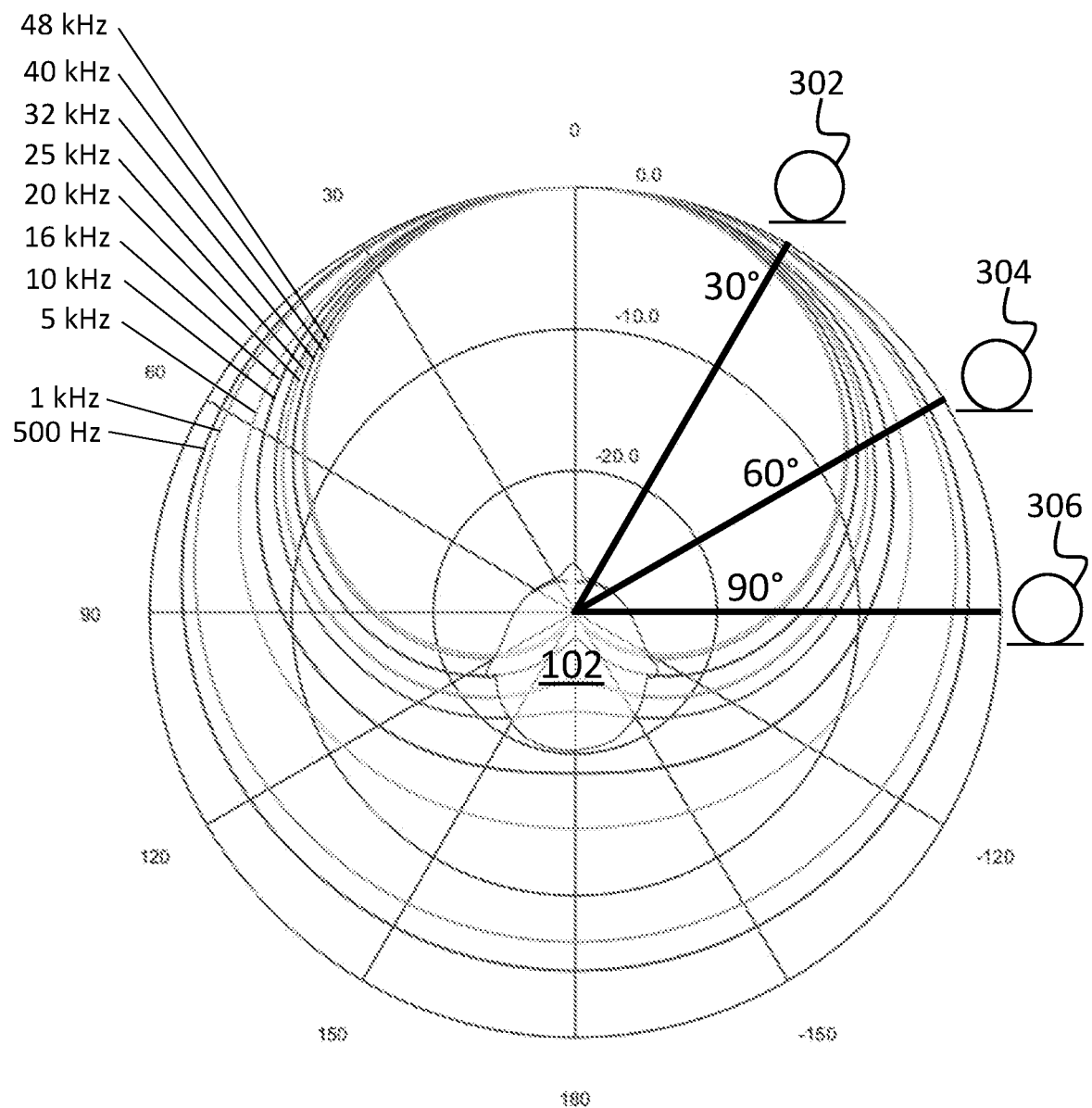
FIG. 3 is a graphical illustration showing spatial radiation patterns of speech of user at different frequencies.

FIG. 3 is a graphical illustration showing spatial radiation patterns of speech of the user 102 at different frequencies, ranging from 500 Hz to 48 kHz. This figure illustrates the directivity loss relative to the recording angle of the user's voice. For the purposes of this disclosure, a recording angle of zero degrees (0°) represents the direction the user 102 is facing when speaking. The user 102 has been superimposed onto the illustration to indicate this fact. Offset from this angle of zero degrees is referred to herein as "directional offset".

It can be seen that at zero degrees, i.e. in the direction the user 102 is facing, the normalised loss of magnitude of speech across the frequency spectrum is practically indistinguishable. That is, amplitude attenuation of speech emanating from the user's mouth in the direction the user is facing is relatively low at all frequencies.

It can be seen that, when compared to lower frequency components, higher frequency components suffer an increased loss in magnitude as the angle of incidence of sound relative to the user-facing direction of the user increases. In particular, the higher the frequency of user speech, the greater the loss in magnitude of that speech at angles other than zero degrees. This relationship becomes most prominent at 180 degrees directional offset (i.e. behind the user's head). It can be seen that there is a large difference in loss when comparing the magnitude of frequency components at zero degrees (in front of the face of the user 102) vs 180 degrees (i.e. behind the head of the user 102). At high frequencies (e.g., 48 kHz), there is a large loss when compared to the lower frequencies (e.g., 500 Hz).

Figure 4:
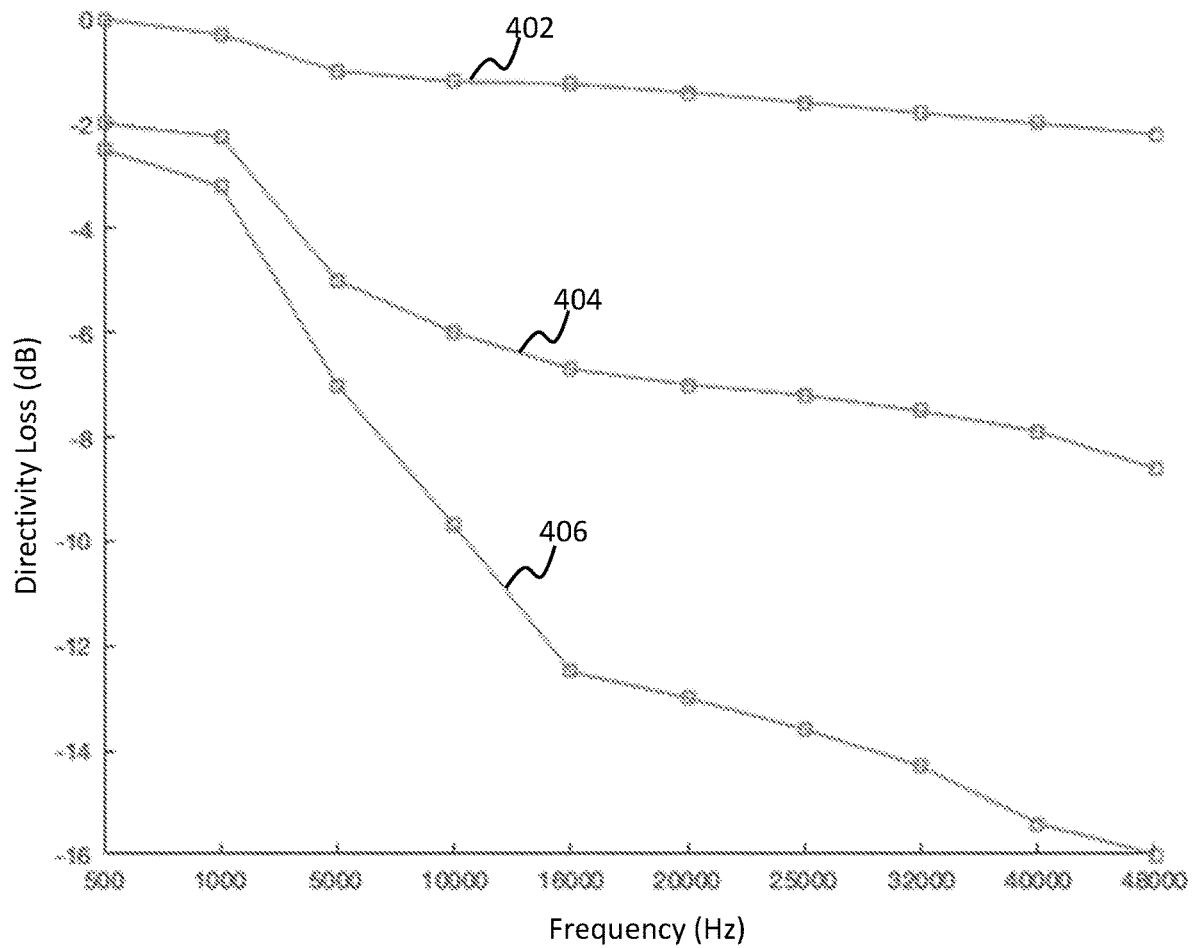
FIG. 4 is a plot of frequency vs directivity loss for speech of the user at different angles relative to the direction the user is facing.

FIG. 4 is a plot of frequency vs directivity loss for speech of the user 102, as recorded by respective microphones 302, 304, 306 shown in FIG. 3, at 30 degrees 402, 60 degrees 404, and 90 degrees 406 direction offset. It can be seen that the spectrums of directivity loss at each of 30 degrees, 60 degrees and 90 degrees are distinguishable due to higher propagation loss at high frequencies for large angles of directional offset.

The inventors have found that the above characteristic of human speech can be used to estimate a likely directional offset of a receiving microphone and therefore a likely direction that a user is facing relative to one or more microphones, such as the microphones 302, 304, 306 shown in FIG. 3. Characteristics of the frequency spectrum of a received signal may therefore be used to determine the direction a user facing direction relative to such microphones 302, 304, 306. Such directional information can be used as the basis for control of functions of one or more devices, such as the smart devices 104A, 104B, 104C, 108 in the environment 100 shown in FIG. 1. Such directional information may optionally be combined with other data, such as but not limited to device user history, user speech loudness, user facing direction history, and the status of each of the smart devices 104A, 104B, 104C, 108 in the environment 100 (or other device), to estimate a probable focus of attention of the user 102.

Example non-limiting processes which utilise aspects of speech directionality will now be described.

For clarity of explanation, performance of the processes may be described with reference to a single one 104A of the smart devices 104A, 104B, 104C, 108 or with reference to multiple devices. It will be appreciated, however, that in other embodiments the various processes or constituent steps may be implemented by one or more of the other smart devices 104B, 104C, 108 or across multiple of those smart devices 104A, 104B, 104C, 108. Additionally or alternatively, the various processes or constituent steps may be implemented by other devices (not shown), such as devices hosted in the cloud.

Whilst embodiments are described with reference to the environment 100 shown in FIG. 1, it will be appreciated that the present disclosure is not limited to such an environment 100. Processes described herein may be implemented in any environment using one or more devices comprising a microphone and capable processing circuitry.

Figure 5:
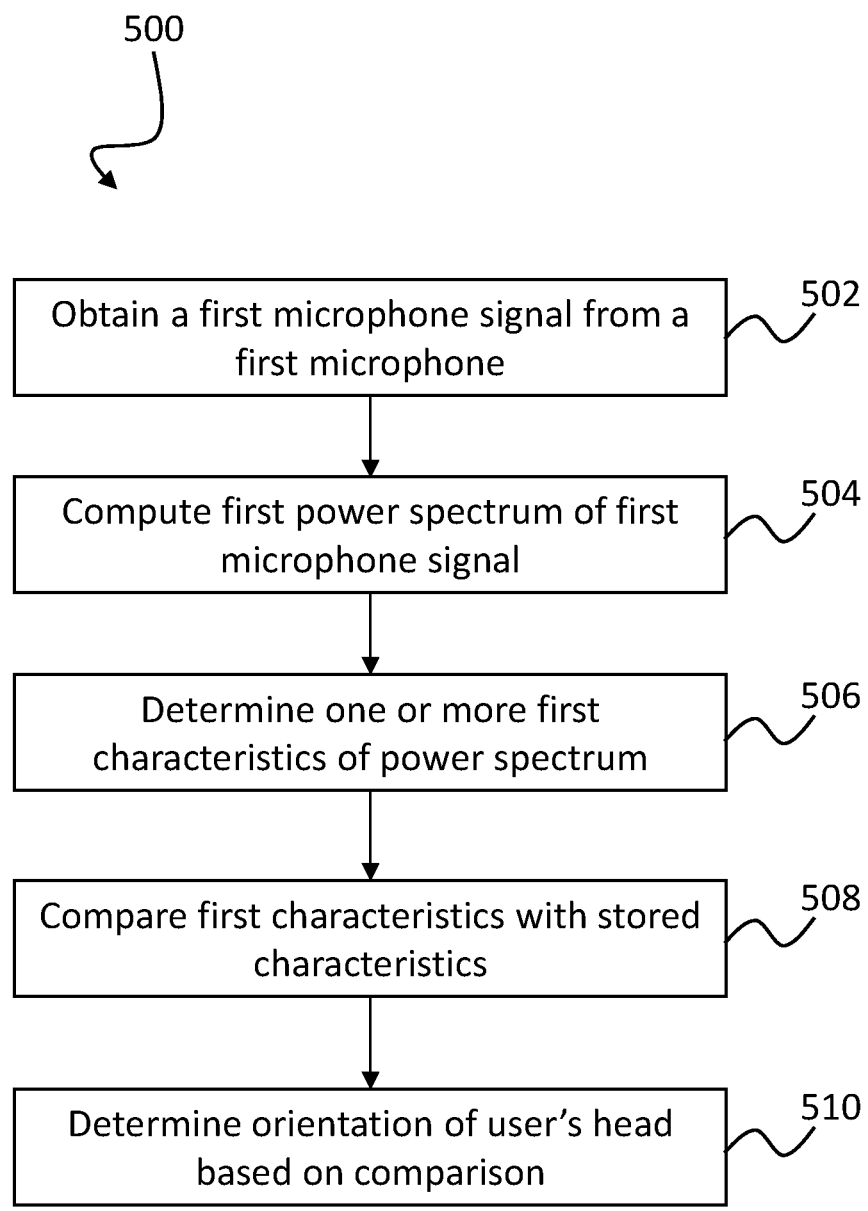
FIG. 5 is a flow diagram for a process which may be implemented in the system of FIG. 1.

Referring to FIG. 5, a process 500 for estimating a likely user-facing direction is shown, which may be implemented on one of the smart devices 104A, 104B, 104C shown in FIG. 1, for example by the processor 202 of the first smart device 104A.

At step 502, the first smart device 104A (or another smart device) may receive an audio speech signal from a user 102 and convert that signal (for example at the first microphone 106A) to a first microphone signal.

At step 504, the processor 202 of the first smart device 104A may compute a first power spectrum of the first microphone signal, for example by performing a Fourier transform (e.g. FFT or DFT) of the received first microphone signal to generate a Fourier power (or magnitude) spectrum.

At step 506, one or more characteristics of the first power spectrum may be determined. As noted above, the frequency spectrum of speech incident to any one of the smart devices 104A, 104B, 104C, 108 in the environment 100 will comprise characteristics which indicate a user-facing direction of the user. Various characteristics of a received microphone signal may be determined. Non-limiting examples of such characteristics include a spectral slope or tilt, a spectral curvature, and a spectral power ratio between two or more frequency bands in a received audio signal comprising voice.

Spectral slope or tilt: As shown in FIG. 3, as the recording angle of recording of speech of the user 102 increases, the relative loss of higher frequency speech relative to low frequency speech increase. That is, the spectral slope of recorded speech increases with the recording angle (the position of the recording device relative to the direction the user 102 is facing). Thus the spectral slope of a speech signal may provide an indication of the location of the microphone relative to the user 102. In some embodiments, the spectral slope may be calculated by applying a linear regression to the magnitude spectrum of the received microphone signal, thereby producing a slope value representing the slope of the line-of-best-fit through the magnitude spectrum.

Spectral curvature: The rate of change of spectral magnitude, or the rate of change of the spectral slope may also be used to characterise a received microphone signal. Spectral curvature C may be computed at multiple points of the spectrum of power spectral density curve of the received microphone signal. The spectral curvature may be calculated using the following formula:

$$\frac{Y''(x)}{\left(1+(Y'(x))^2\right)^{\frac{3}{2}}}$$

Where x denotes a frequency value and Y(x) denotes either the FFT magnitude (normalised) or the power spectral density (normalised) at a frequency x. In practice, it may be preferable to smooth Y(x) to obtain improved estimates of the first and second derivatives of Y with respect to x. Such smoothing may be achieved using convolution as is known in the art. Spectral curvature can be used to locate and quantify the relevance of inflection points where spectral slopes and convexity are changing. This may be useful for distinguishing among families of curves/frequency spectrums of speech. For example, in FIG. 4, the directivity loss curves denoted 404 and 406 share a similar concave down inflection point at around 1000 Hz (and therefore similar spectral curvature values bridging this frequency). However, when compared to the directivity loss curve 404, the directivity loss curve 406 has a larger concave, and therefore higher spectral curvature value, at around 16000 Hz. It can be seen, therefore, that such inflection points may provide distinctive markers for particular directional offset. It will also be appreciated that, in some circumstances, the value of spectral curvature at one or more frequencies may provide a more distinctive feature than, for example, absolute power level at a given frequency or spectral tilt. Whilst specific values of spectral curvature are local to a given frequency at which they are determined, it is possible to summarise spectral curvature over a frequency range by taking an average or maximum value over that frequency range.

Spectral power ratio: As noted above, as the recording angle of recording of speech of the user 102 increases, the relative loss of higher frequency speech relative to low frequency speech increase. In some embodiments, instead of determining the spectral slope of the magnitude spectrum, a ratio of power/magnitude in two sub-bands of a received microphone signal may be calculated. For example, a ratio of the power/magnitude of a received microphone signal at 1 kHz vs the received microphone signal at or above 20 kHz may be determined.

Referring again to FIG. 3, at step 508, the one or more characteristics of the received microphone signal may then be compared to stored empirical and/or model data. Such stored data may comprise empirical data obtained from the user 102, another user or a cohort of users. Such stored data may comprise modelled data based on a model of directivity loss at multiple angles of directional offset.

In some embodiments, a mapping F(X)=+/−θ may be constructed to predict a directional offset relative to straight ahead (i.e. zero degrees). F(X) may be a linear regression (in the case of spectral tilt) or polynomial regression (in the case of spectral curvature).

At step 510, based on the comparison, an estimate may be calculated as to a likely user-facing direction and/or the orientation of the user's head relative to one or more devices, such as the smart devices 104A, 104B, 104C, 108 in the environment 100.

In addition to or an alternative to comparing the one or more computed characteristics with stored characteristics, the one or more determined characteristics may be provided to a neural network. For example, a neural network may be trained with inputs relating to one or more characteristics of the received microphone signal, such as empirical or modelled data. The trained neural network may then be used to predict the directional offset (or the orientation of the user's head) based on the determined characteristic. Any machine learning-based implementation may be conceived (e.g., random forest, support vector machine, etc.).

For example, a neural network may operate on its inputs to perform a regression (e.g., non-linear), outputting an estimate of the user-facing direction or directional offset of a smart device. If the inputs include the spectrum itself or the power density spectrum, then the natural architecture for the neural network may include convolutional layers in addition to standard multi-player perceptron layers. If the received microphone/audio signal is sampled over an extended time period (e.g. hundreds of milliseconds), then recurrent layers (or any conceivable type) may be provided.

In another example, a neural network may operate on its inputs to determine a conditional probability, for example the conditional probability that a given smart device is the focus of the user's attention. Such a network may take, as input features, previously computed user-facing direction or directional offset values as well as one or more device specific characteristics. Such specific characteristics may comprise additional focus data comprising one or more of usage history data, internal state information, loudness of speech in one or more microphone signals, history of estimated user-facing direction (or likely focus), and content of user command contained in speech. Such additional focus data is described in more detail below. Again, the neural network architecture may comprise multi-layer perception layers and may comprise recurrent layers. The neural network architecture may also comprise convolutional layers.

In view of this, two different neural networks (such as those two examples described above) may be implemented per smart device. Alternatively, computations of both user-facing direction/directional offset and focus probability may be performed by a single neural network with an appropriate combined network architecture.

It will be appreciated that if the above process 500 is performed with respect to a single microphone source, e.g. the first microphone 106A or the second microphone 106B, any estimate of the user facing direction at step 510 may have two results. For example, with reference to FIG. 3, frequency spectrum characteristics of a speech signal received at 30 degrees from the user facing direction will be substantially identical to frequency spectrum characteristics of the same speech signal received at −30 degrees from the user facing direction.

In view of this, each of the first and second smart devices 104A, 104B (or any two spatially separated devices comprising microphones) may independently perform the process 500 described above to determine a likely user-facing direction with respect to its own location. With knowledge of the respective locations of each of the first and second smart device 104A, 104B, in addition to the results ascertained at step 510 with respect to each of the first and second smart device 104A, 104B, a more accurate estimate of the user-facing direction can be ascertained.

In some embodiments, upon completion of the process 500 described above, each of the first and second smart devices 104A, 104B may communicate its estimate of the likely user-facing direction to one or more other devices, such as the hub device 108.

Additionally or alternatively, each of the first and second smart devices 104A, 104B may perform steps 502 to 506 without steps 508 and 510. In which case, each of the first and second smart devices 104A, 104B may communicated respective determined frequency spectrum characteristics to another device, such as the hub device 108. That device, e.g., the hub device 108, may then use the respective frequency spectrum characteristics to determine the likely user-facing direction of the user 102 relative to the smart devices 104A, 104B, 104C in the environment 100.

In a further variation, each of the first and second smart devices 104A, 104B may only perform steps 502 and 504 of the process 500, sending the computed respective first power spectrums to the hub device 108 which may then be configured to perform steps 506, 508 and 510 to determine a likely user-facing direction.

In yet a further variation, each of the first and second smart devices 104A, 104B may only perform step 502, sending respective microphone signals to the hub device 108 for processing. In which case, the hub device 108 may perform steps 504 to 510 of the process.

In the environment 100 shown in FIG. 1, even though the third smart device 104C does not comprise a microphone, a determination of the likely user-facing direction with respect to the third smart device 104C may be ascertained based on a determined likely user-facing direction relative to the first and second smart device 104A, 104B. Such a determination can be made, provided the respective positions of the first, second and third smart devices 104A, 104B, 104C in the environment is known. Such a determination may be performed via triangulation as is known in the art. The computation of the likely user-facing direction relative to the third smart device 104C (or any other device in the environment 100 not comprising a microphone) may be performed by any one of the first, second and third smart devices 104A, 104B, 104C or the hub device 108, provided that device possesses the relative positioning information for all affected devices and the relative likely user-facing direction information for the first and second smart devices 104A, 104B, as determined from respective microphone signals.

Once a likely user-facing direction has been estimated, collectively for all smart devices 104A, 104B, 104C and/or independently in respect of each of the first, second and third smart devices 104A, 104B, 104C, a determination may made as to a likely focus (or attention) of the user 102 relative to smart devices in the environment 100.

The determination of likely focus of the user 102 may be made based on the likely user-facing direction data alone or in combination with additional focus data. Such additional focus data may comprise one or more of the following.

Usage history: Usage history of one or more of the smart devices 104A, 104B, 104C may indicate the historical focus of the user 102. For example, if the user 102 was previously interacting with the first smart device 104A, the likelihood that the focus of the user 102 is still on the first smart device 104A may be higher than the likelihood that the focus of the user 102 is on another smart device. This may be true even if the subsequent user facing direction is to a device other than the first smart device 104A.

Internal state: An internal state of one or more of the smart devices 104A, 104B, 104C may be used to indicate a current focus of the user 102. For example, if one of the smart devices 104A, 104B, 104C is already performing a function in response to a command from the user 102, then this may be an indication that the user's attention is on that smart device.

Loudness of speech in a microphone signal: It will be appreciated that it may be difficult to distinguish between the user 102 speaking quietly near a smart device or the same user 102 speaking more loudly further away from smart device. However, if the loudness of speech in a received microphone signal is above a predetermined threshold (i.e. the speech is very loud) this may be indicative of the user 102 being very close to that particular smart device. In which case, it may be more likely that the user's attention is on that smart device. Loudness information may be combined with other spectral analysis to determine the effort of the speech of the user 102. For example, certain spectral features may indicate that the user 102 is shouting or straining their voice. In which case, the user 102 may be far away from a smart device even though the loudness of speech in a microphone may be above the predetermined threshold.

History of estimated user-facing direction (or likely focus): History of previously estimated user-facing direction may be used to determine a future likelihood of user-facing direction and therefore likely focus of the user 102. For example, if a user 102 was previously facing (or focused on) a particular one of the smart devices 104A, 104B, 104C, it may be more likely that the user 102 is continuing to face (or focus on) that smart device.

Content of user command contained in speech: It will be appreciated that the speech contained in the microphone signal being analysed for frequency spectrum characteristics may contain a command. Such a command may be directed specifically to one of the smart devices 104A, 104B, 104C in the environment 100. This may, in turn, provide an indication regarding the focus of the user's attention. For example, if the command is directed to the first smart device 104A, it may be more likely that the user's focus is on the first smart device 104A than other smart devices in the environment 100.

Relative position of devices: The relative position of the smart devices 104A, 104B, 104C may introduce ambiguity as to the focus of attention. For example, if two smart device are located proximate to one another, it may be more difficult to distinguish which of those devices the user is focused on than if those two smart device were located further apart.

In some embodiments, each of the first, second and third smart devices 104A, 104B, 104C which has obtained a respective estimate of likely user-facing direction relative to itself may compute a focus score corresponding to a probability that that device is the focus of the user's attention. Computation of the focus score may optionally take into account one or more of the above additional focus data. Once computed, any focus scores may be shared with other devices, such as the other smart devices 104A, 104B, 104C or the hub device 108. Each of the first, second and third smart devices 104A, 104B, 104C may independently compare its focus score against focus scores associated with others of the first, second and third smart devices 104A, 104B, 104C. A device with the highest focus score may be assumed to be the attentional focus of the user. Where the microphone signal comprises a speech command from the user, the determined focus scores may be used, for example, to determine which of the first, second and third smart devices 104A, 104B, 104C the speech command is directed at and that device respond accordingly (e.g., by performing a function in response to the speech command contained in the speech).

Additionally, or as an alternative to each device computing a respective focus score, one or more of the smart devices 104A, 104B, 104C or the hub device 108 may receive (or locally compute) all of the estimates of likely user-facing direction for devices in the environment 100 and determine a most probably target of the user's attention (i.e. a global estimate).

Figure 6:
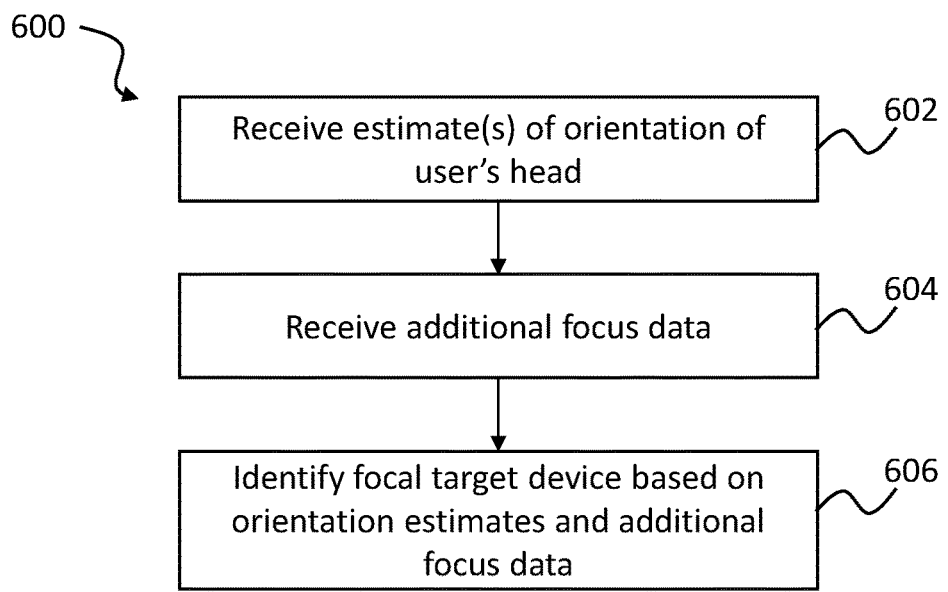
FIG. 6 is a flow diagram for a process which may be implemented in the system of FIG. 1.

FIG. 6 illustrates an example process 600 for determining a likely focal target of the user 102. The process 600 may be performed at one or more of the smart devices 104A, 104B, 104C, the hub device 108, or in another device, for example in the cloud.

At step 602, one or more estimates of orientations of the user's head (the likely user facing direction) may be received (or determined locally).

At step 604, additional focus data such as those described above, may also be received.

At step 606, a focal target device may be identified based on the one or more estimates of the user's facial orientation and the additional focus data. For example, a focus score may be computed for each device for which likely user-facing direction estimate has been provided, and the device with the higher focus score assigned as the focal target device.

In the embodiment shown in FIG. 1, the first, second and third smart device 104A, 104B, 104C are present in the environment 100. There may be instances, however, in which an additional device enters the environment 100.

Figure 7:
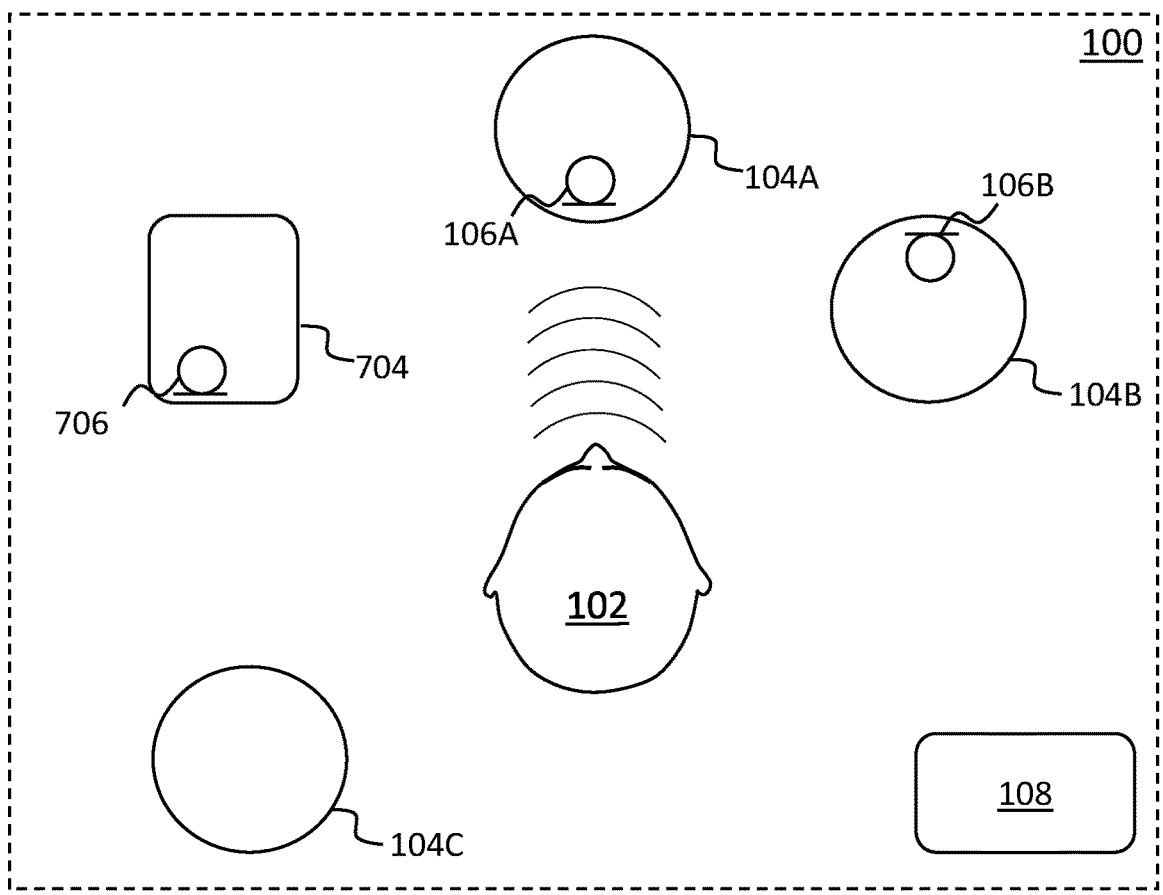
FIG. 7 is a schematic illustration of the system of FIG. 1 further comprising a guest device.

FIG. 7 illustrates an example scenario in which a guest device 704 enters the environment 100. The guest device 704 may or may not comprise a microphone 706. In such a situation, the guest device may participate in any of the above described methods and processes, such as processes 500, 600. In which case, the guest device 704 may be configured to estimate a likely user-facing direction with respect to itself. The guest device 704 may be configured to communicate this estimate to other devices in the environment 100 (or outside of the environment 100). In such embodiments, the guest device may determine the likely user-facing direction of the user 102 with respect to itself and the estimate of probable focus and/or focal target device may be performed using any of the techniques described above.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. A system, comprising:
   a plurality of distributed smart devices comprising:
      a first smart device having a first microphone;
      a second smart device having a second microphone; and
   processing circuitry, configured to:
      receive, from the first microphone, a first microphone signal comprising speech of a user;
      receive, from the second microphone, a second microphone signal comprising the speech of the user;
      determine an orientation of the user's head relative to the first smart device and the second smart device based on the first microphone signal and the second microphone signal, wherein determining the orientation of the user's head comprises comparing first power levels in a plurality of frequency bands of the first microphone signal; and
      controlling one or more of the plurality of distributed smart devices based on the determined orientation;
   wherein determining the orientation of the user's head comprises:
      computing a first power spectrum of the first microphone signal over the plurality of frequency bands of the first microphone signal; and
      determining one or more characteristics of the first power spectrum;
   wherein the one or more characteristics comprises one or more of:
      a) spectral slope;
      b) spectral tilt;
      c) spectral curvature; and
      d) a spectral power ratio between two or more of the plurality of frequency bands.

2. The system of claim 1, wherein determining the orientation of the user's head further comprises:
   comparing the one or more characteristics of the first power spectrum with one or more stored characteristics.

3. The system of claim 1, wherein determining the orientation of the user's head further comprises:
   providing the first power spectrum or the one or more characteristics to a neural network.

4. The system of claim 1, wherein the processing circuitry is configured to:
   compare second power levels in a plurality of frequency bands of the second microphone signal; and
   determine the orientation of the user's head relative to the second smart device based on the comparison of second power levels.

5. The system of claim 4, wherein the processing circuitry is configured to:
   communicate the determined orientation of the head between the first smart device and the second smart device.

6. The system of claim 4, wherein the processing circuitry is at least partially comprised in the first smart device and/or the second smart device.

7. The system of claim 4, wherein the first and second smart devices are configured to communicate via a network interface.

8. The system of claim 4, wherein the first and second smart devices are peripheral devices, wherein the plurality of distributed smart devices comprises a hub device, and wherein the first and second smart devices are configured to transmit respective first and second microphone signals to the hub device.

9. The system of claim 8, wherein the processing circuitry is at least partially comprised in the hub device.

10. The system of claim 8, wherein the plurality of distributed smart devices comprises a third smart device, wherein the processing circuitry is configured to:
    receive a location of the third smart device relative to the first smart device and the second smart device; and
    determine a user location of the user based on the location of the third smart device and a location of the first smart device and the second smart device.

11. The system of claim 1, wherein the processing circuitry is further configured to:
    determine a first probability that the first smart device is a focus of the user's attention based on the determined orientation of the head of the user.

12. The system of claim 11, wherein the processing circuitry is further configured to:

determine a second probability that the second smart device is a focus of the user's attention based on the determined orientation of the head of the user.

13. The system of claim 12, wherein the processing circuitry is configured to:
identify one of the first smart device and the second smart device as a focus of the user's attention based on the first probability and the second probability.

14. The system of claim 13, wherein the processing circuitry is configured to:
associate a user command comprised in the speech to the identified one of the first smart device and the second smart device.

15. The system of claim 11, wherein the first probability and/or the second probability are estimated based one or more of:
a) a usage history of the first smart device and/or the second device;
b) an internal state of the first smart device and/or the second device;
c) a loudness of speech in the first microphone signal;
d) a history of estimated orientations of the head of the user; and
e) content of a user command contained in the speech.

16. The system of claim 1, wherein the processing circuitry is further configured to:
estimate a direction of focus of the user's attention based on the determined orientation.

17. The system of claim 1, wherein the first smart device comprises one of a mobile computing device, a laptop computer, a tablet computer, a games console, a remote control device, a home automation controller or a domestic appliance, a toy, a robot, an audio player, a video player, or a mobile telephone, and a smartphone.

18. A method in a network of distributed smart device, the method comprising:
receiving, at a first microphone of a first smart device, a first microphone signal comprising speech of a user;
receiving, at a second microphone of a second smart device, a second microphone signal comprising the speech;
determining an orientation of a head of the user relative to the first smart device and the second smart device based on the first microphone signal and the second microphone signal, wherein determining the orientation of the user's head comprises comparing first power levels in a plurality of frequency bands of the first microphone signal; and
controlling one or more of the network of distributed smart devices based on the determined orientation;
wherein determining the orientation of the user's head comprises:
computing a first power spectrum of the first microphone signal over the plurality of frequency bands of the first microphone signal; and
determining one or more characteristics of the first power spectrum;
wherein the one or more characteristics comprises one or more of:
a) spectral slope;
b) spectral tilt;
c) spectral curvature; and
d) a spectral power ratio between two or more of the plurality of frequency bands.

19. A non-transitory storage medium having instructions thereon which, when executed by a processor, cause the processor to perform the method of claim 18.

20. A system for determining an orientation of a user's head, the system comprising:
a first smart device having a first microphone;
processing circuitry configured to:
receive a first microphone signal comprising speech from the first microphone;
compare first power levels in a plurality of frequency bands of the first microphone signal;
determine an orientation of the user's head relative to the first smart device based on the comparison of first power levels;
wherein determining the orientation of the user's head comprises:
computing a first power spectrum of the first microphone signal over the plurality of frequency bands of the first microphone signal; and
determining one or more characteristics of the first power spectrum;
wherein the one or more characteristics comprises one or more of:
a) spectral slope;
b) spectral tilt;
c) spectral curvature; and
d) a spectral power ratio between two or more of the plurality of frequency bands.

* * * * *